United States Patent
Chao

Patent Number: 5,823,010
Date of Patent: Oct. 20, 1998

[54] AIR CONDITION INSTALLATION ADJUSTABLE IN STORING AND DISPENSING COOLNESS

[76] Inventor: Ching-I Chao, No. 20, To-Chiang street, Chien-Chen District, Kaohsiung City, Taiwan

[21] Appl. No.: 865,941

[22] Filed: May 30, 1997

[51] Int. Cl.[6] ......................................... F25D 11/00
[52] U.S. Cl. ............................ 62/434; 67/430; 165/902
[58] Field of Search .......................... 62/430, 434, 436, 62/437, 59; 165/10, 902, 104.17, 104.14, 104.21

[56] References Cited

U.S. PATENT DOCUMENTS 4,831,831  5/1989  Carter et al. .............................. 62/434
5,090,207  2/1992  Gilbertson et al. ....................... 62/434

*Primary Examiner*—John M. Sollecito
*Attorney, Agent, or Firm*—Dougherty & Troxell

[57] ABSTRACT

An air condition installation adjustable in storing and dispensing coolness includes a coolant circulating course, an unfreezable liquid circulating course, one or more cool-storing tanks and a blower. The cool-storing tank consists of a cylindrical hollow tank filled with a cool-storing liquid, a tubular body housed in the tank, and two separated chambers in the front portion of the tank. The tubular body has an inlet and an outlet respectively communicate with the separated chambers and then with the unfreezable liquid circulating course so as to permit the unfreezable liquid exchange heat with the cool-storing liquid. Each cool-storing tank is of small dimensions to save space for installing, having high heat effect, able to be made to have plural small units.

6 Claims, 3 Drawing Sheets though the coolant circulating course 2 has stopped running, effecting energy saving and easing adjustment in storing coolness in off-peak period and dispensing coolness in the peak period.

AIR CONDITION INSTALLATION ADJUSTABLE IN STORING AND DISPENSING COOLNESS

BACKGROUND OF THE INVENTION

This invention concerns an air condition installation adjustable in storing and dispensing coolness, particularly having a plurality of small units to be used independently from one another, able to be used himanizingly, saving energy, having high heat effect, and economizing space needed.

Nowadays a known conventional air condition installation commonly used in a large building shown in FIG. 1 comprises a compressor 10 (of at least 50 HP of contract capacity), a circulatory tube 11 for coolant to circulate therein, an ice storing tank 12 in which the large part of the tube 11 is immersed, and a pump 13 connected with the ice storing tank 12, a second tube 14 connected between the pump 13 and a blower 15. The water contained in the ice storing tank 12 may be cooled down by the coolant in the circulatory tube 11 nearly to 0 degree (or almost frozen), blown by the pump 13 into the second tube 14 to cool down the air in the room where the blower 15 is located in, and then the cooled air may be blown out into a room for air conditioning.

The aforesaid conventional air condition installation has disadvantages as follows.

1. Its electricity consumption is large, even if there is no need for such a large power of 50 HP, such installation has to be installed owing to the contract.

2. It occupies a comparatively large space, extremely hard to be installed in a large city where land costs surprisingly high.

3. It does not suit for a small or medium house because of its high electric consumption and its large dimensions.

4. Electricity used by it installed in a building is aggregately calculated and paid as an unit, impossible to be individually calculated according to the volume used by different occupants of the building, causing inequality of payment of electricity charge.

By the way, as to "greenhouse effect" of the our earth, average temperature of the earth has been rising gradually, and summer season in some regions, lasting for four to six months before, but now lasts even eight or nine months so that air condition installations have to be used now for two times longer than before. Consequently, in various countries policy of electricity payment in accordance with "peak period" and "off-peak period" has been gradually put in effect. And the proportion of disparity of electric charge between "peak period" and "off-peak period" goes as far as 2 to 1.

SUMMARY OF THE INVENTION

The main purpose of the invention is to offer an air condition installation possible to be operated with a plurality of small units independently from one another, able to be used humanizingly, saving energy, having high heat effect, needing small space, and substantially adjustable in storing and dispensing coolness.

One feature of the invention is an ice storing tank consisting of a container filled with a cool-storing liquid for heat exchange, a tubular body arranged in the container and having an inlet and an outlet respectively communicating with an unfreezable liquid circulating course so that the unfreezable liquid (saline water) circulating in the unfreezable liquid circulating course may flow through the tubular body and exchange heat with the cool-storing liquid in the container, and two separated chambers located in front of the inlet and the outlet of the tubular body.

Another feature of the invention is an electro-magnetic valve provided to be connected with a part of the unfreezable liquid circulating course for selectably connect the unfreezable liquid circulating course with a coolant circulating course or with a blower.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
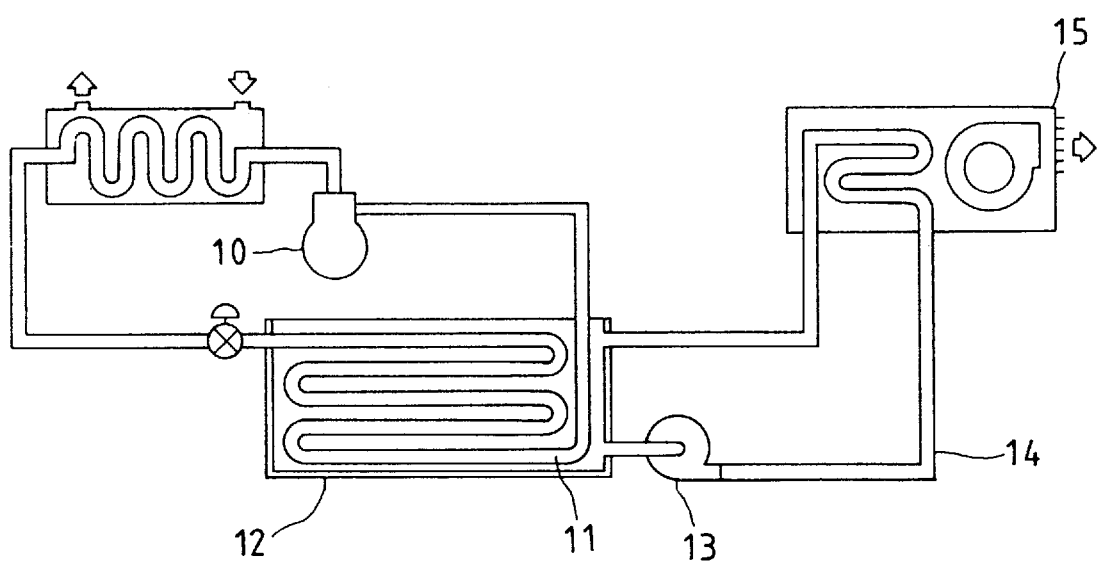
FIG. 1 is an upper view of an ice storing device of a known conventional air condition installation.
Figure 2:
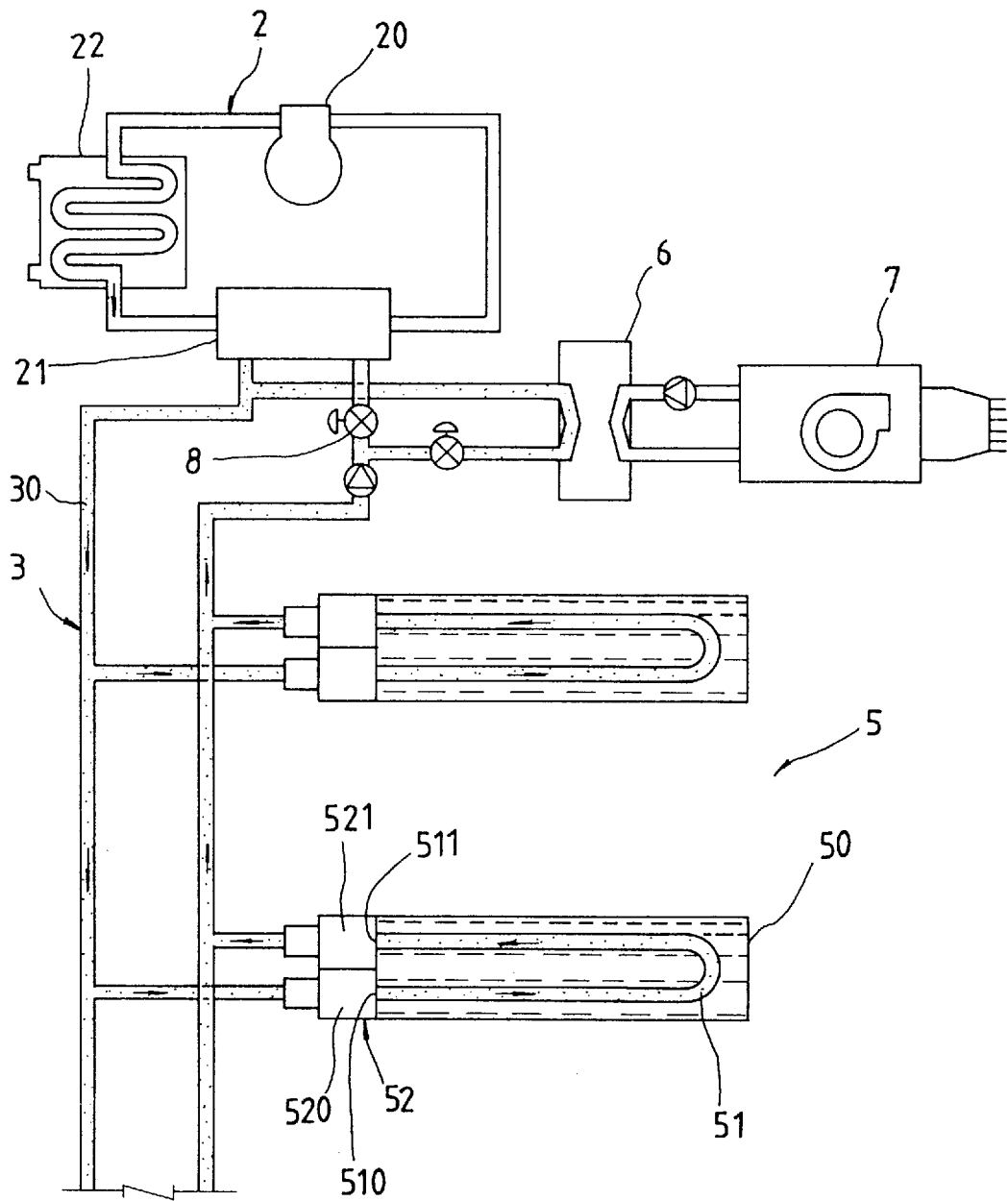
FIG. 2 is an upper view of a preferred embodiment of an air condition installation in the present invention.
Figure 3:
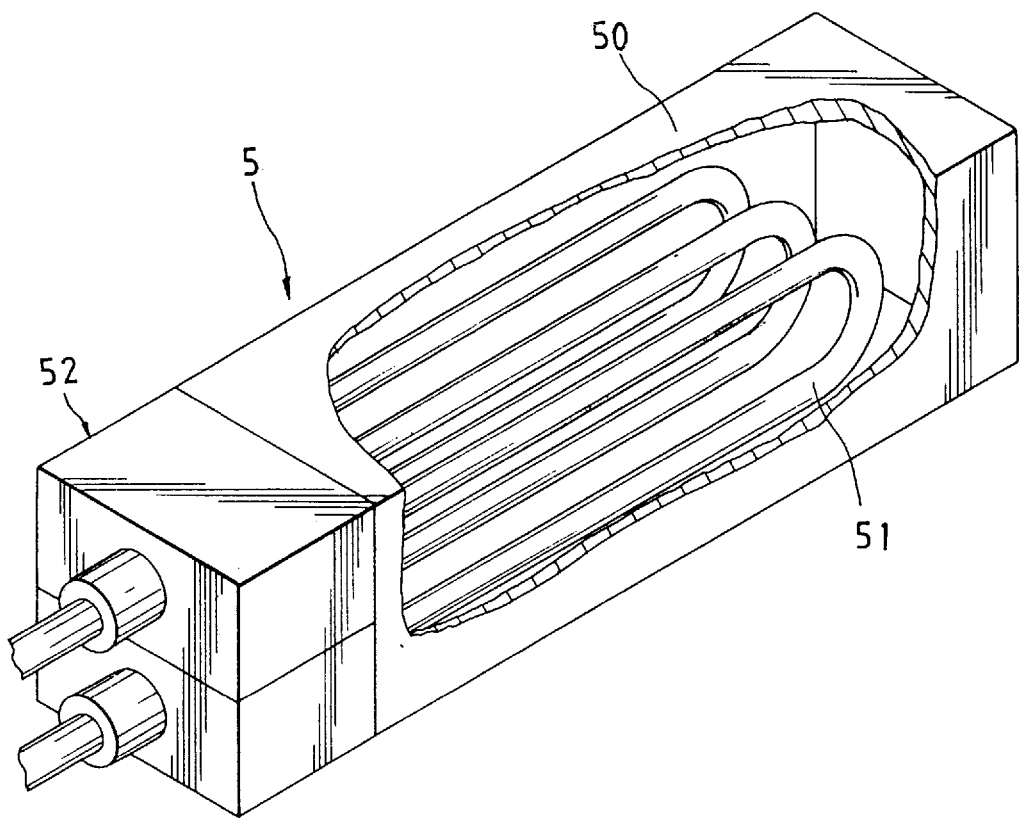
FIG. 3 is a perspective view of an ice storing device of the air condition installation in the present invention; and, FIG. 4 is a cross-sectional view of the ice storing device of the air condition installation in the present invention.
Figure 4:
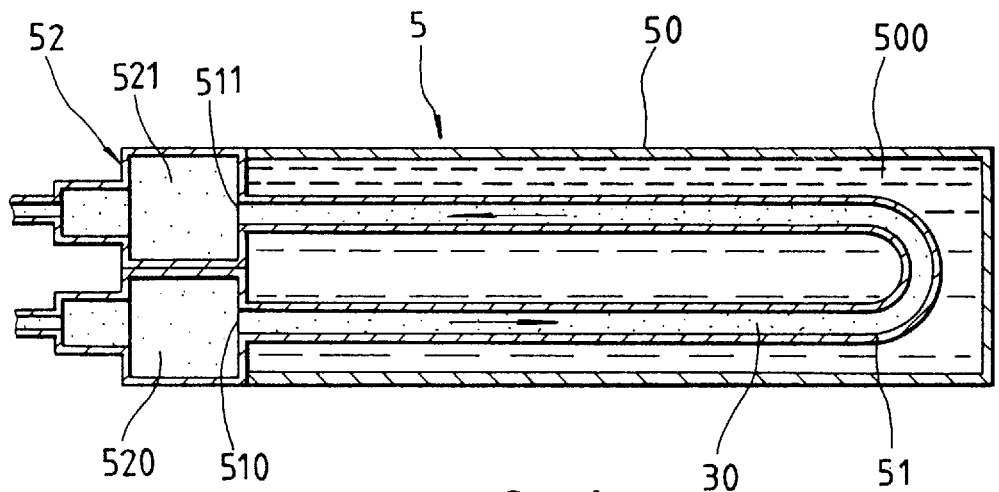

A preferred embodiment of air condition installation in the present invention, as shown in FIGS. 2, 3 and 4, includes at least a coolant circulating course 2 consisting of a compressor 20, a cooler 21, and a coolant condenser 22, an unfreezable liquid circulating course 3 for saline water 30 to circulate therein, an ice storing tank 5, a plate-shaped heat exchanger 6 connected with the unfreezable liquid circulating course 3, a blower 7 also connected with the unfreezable liquid circulating course 3 for blowing air with proper temperature into a room for air conditioning.

The unfreezable liquid circulating course 3 is connected with an electro-magnetic valve 8 at a proper point, by which the unfreezable liquid circulating course 3 may selectably be communicated with the coolant circulating course 2 or the blower 7 so as to obtain effect in adjusting in storing coolness in the off-peak period and dispensing coolness during the peak period.

As can be seen from FIG. 2, the unfreezable liquid circulating course 3 is for circulating the liquid (saline water) for exchanging heat by passing through the coolant circulating course 2 so that the coolant does not need to circulate all the tubular courses of the whole air condition installation, in order to save quantity of the coolant needed and to reduce the volume to be lost. The basic components described above are indispensable elements for the ice storing tank 5 of the air condition installation in the invention in acquiring air conditioning effect.

However, the important characteristics of the invention is not the components except the ice storing tank(s) 5, which respectively includes a container body 50, a tubular body 51, and two separated chambers 52, 52.

The container body 50 is a sealed hollow container, filled with a cool-storing liquid 500 which exclusively exchanges heat with the unfreezable liquid, i. e. saline water 30 in the unfreezable liquid circulating course 3 during the off-peak period and becomes frozen to store coolness after rapidly lowering its own temperature. And during the peak period the frozen cool-storing liquid 500 supplies its stored coolness to the saline water 30 and then through the plate-shaped heat exchanger 6 and by the blower 7 cool air of proper temperature can be blown out for air conditioning a room.

Of course, the material of the container body 50 have to be of anti-corrosion, of anti-break, and of high heat conducting characteristics such as stainless steel, ABS (plastics of polymer of high particles), etc.

The tubular body 51 is arranged inside the container body 50, having an inlet 510 and an outlet 511 communicating with the unfreezable liquid circulating course 3, permitting the unfreezable liquid 30 pass through the tubular body 51 housed in the container body 50 so that the unfreezable liquid 30 and the cool-storing liquid 500 may exchange heat with each other.

The tubular body 51 should be made of material having characteristics of anti-corrosion, anti-break, and high heat conductivity, such as ABS or PE. As in exchanging heat process of the cool-storing liquid 500 and the saline water 30, the tubular body 51 may shrink and expand in a very small degree according to its material characteristics without breaking. At the same time, saline water 30 has oxidizing tendency, so ABS or PE tubes can resist corrosion, enduring longer without necessity of repair or replacement, as compared with metal tubes. In addition, the unfreezable liquid 30 in the tubular body 51 may expand a little owing to its nearly frozen condition, so the tubular body 51 of ABS or PE may prevent break caused by such expansion from happening.

The two separated chambers 52 are provided to be located at a front end of the container body 50, communicating with the unfreezable liquid circulating course 3, and also located in front of the inlet 510 and the outlet 511 of the tubular body 51 so that each separated chamber 52 forms an inlet area 520 and an outlet area 521 completely separated for the unfreezable liquid 30 to flow through.

As can be seen from the figures, an electro-magnetic valve 8 may be provided at a proper point of the unfreezable liquid circulating course 3. The electro-magnetic valve 8 can be operated to selectably permit the unfreezable liquid circulating course 3 communicate with the coolant circulating course 2 or with the blower 7. Then, during the off-peak period, the electro-magnetic valve 8 is selectably operated to make the unfreeable liquid circulating course 3 communicate with the coolant circulating course 2 so that the coolant and the saline water 30 exchange heat with each other, letting the saline water 30 rapidly drop its own temperature and further force the cool-storing liquid 500 frozen to store coolness.

On the contrary, during the peak period, the electromagnetic valve 8 can be selectably operated to let the unfreezable liquid circulation course 3 communicate with the blower 7, no longer communicating with the coolant circulating course 2, with the frozen cool-storing liquid 500 exchanging heat with the saline water 30 so as to let the saline water 30 circulating with a constant low temperature and also let the blower 7 to blow cooled air out into a room for air conditioning it.

It is evident that if the frozen cool-storing liquid 500 melts during heat exchange process or the temperature of the saline water 30 rises up not a little, the electro-magnetic valve 8 will automatically operate to force the unfreezable liquid circulating course 3 closed from the blower 7, and communicate with the coolant circulating course 2 again so that the unfreezable liquid 30 may rapidly drop its temperature to let the cool-storing liquid 500 frozen to store coolness, and thus incessantly circulates to perform heat exchange and store and dispense coolness.

The air conditioning installation in the present invention has advantages as follows.

I claim:

1. An air conditioning installation adjustable in storing and dispensing coolness, comprising a coolant circulating course including a cooler and a compressor for circulating a cooling fluid therethrough, an unfreezable liquid circulating course, in communication with said cooler and including a plurality of ice storing tanks connected to the unfreezable liquid circulating course in parallel flow relationship, said unfreezable liquid circulating course further communicating with a blower for distributing air of a desired temperature for air conditioning; and a valve in said unfreezable liquid circulating course is as to selectively control flow of an unfreezable liquid through the cooler and the blower;

a hollow container body filled with a cool-storing liquid for exchanging heat with the unfreezable liquid circulating in said unfreezable liquid circulating course;

a tubular body located in said container body, the tubular body having an inlet end and an outlet end separately communicating with said unfreezable liquid circulating course so that said unfreezable liquid circulates through said tubular body in said cylindrical body so as to exchange heat with said cool-storing liquid; and, two separate chambers located in a front portion of said container body, each chamber separately communicating with said unfreezable liquid circulating course, a first chamber communicating with said inlet end of said tubular body and a second chamber communicating with said outlet end of said tubular body so that said unfreezable liquid flows through one of said separate chambers into said inlet end of said tubular body and out of said outlet end of said tubular body into the other of said separated chambers and then flows through said unfreezable liquid circulating course.

2. The air conditioning installation adjustable in storing and dispensing coolness as claimed in claim 1, wherein said container body is preferably made of a material having anti-corrosion, anti-break and high heat conducting characteristics.

3. The air conditioning installation adjustable in storing and dispensing coolness as claimed in claim 1, wherein said tubular body is preferably made of material having anti-corrosion, anti-break, and high heat conducting characteristics.

4. It can be divided into many small units for separate use, using independent compressors of less than 50 HP contract capacity, designed to have a structure of easy assemblage, and able to save energy by storing coolness during the off-peak period and dispensing coolness during the peak period.

5. The air conditioning installation adjustable in storing and dispensing coolness as claimed in claim 1, wherein said two separate chambers form a flowing-in area and a flowing-out area for said unfreezable liquid completely separated from each other.

6. The air conditioning installation adjustable in storing and dispensing coolness as claimed in claim 1, wherein said valve comprises an electro-magnetic valve which controls said unfreezable liquid circulating through said cooler and said blower.

* * * * *